ately rectangular in cross section and
UNITED STATES PATENT OFFICE.

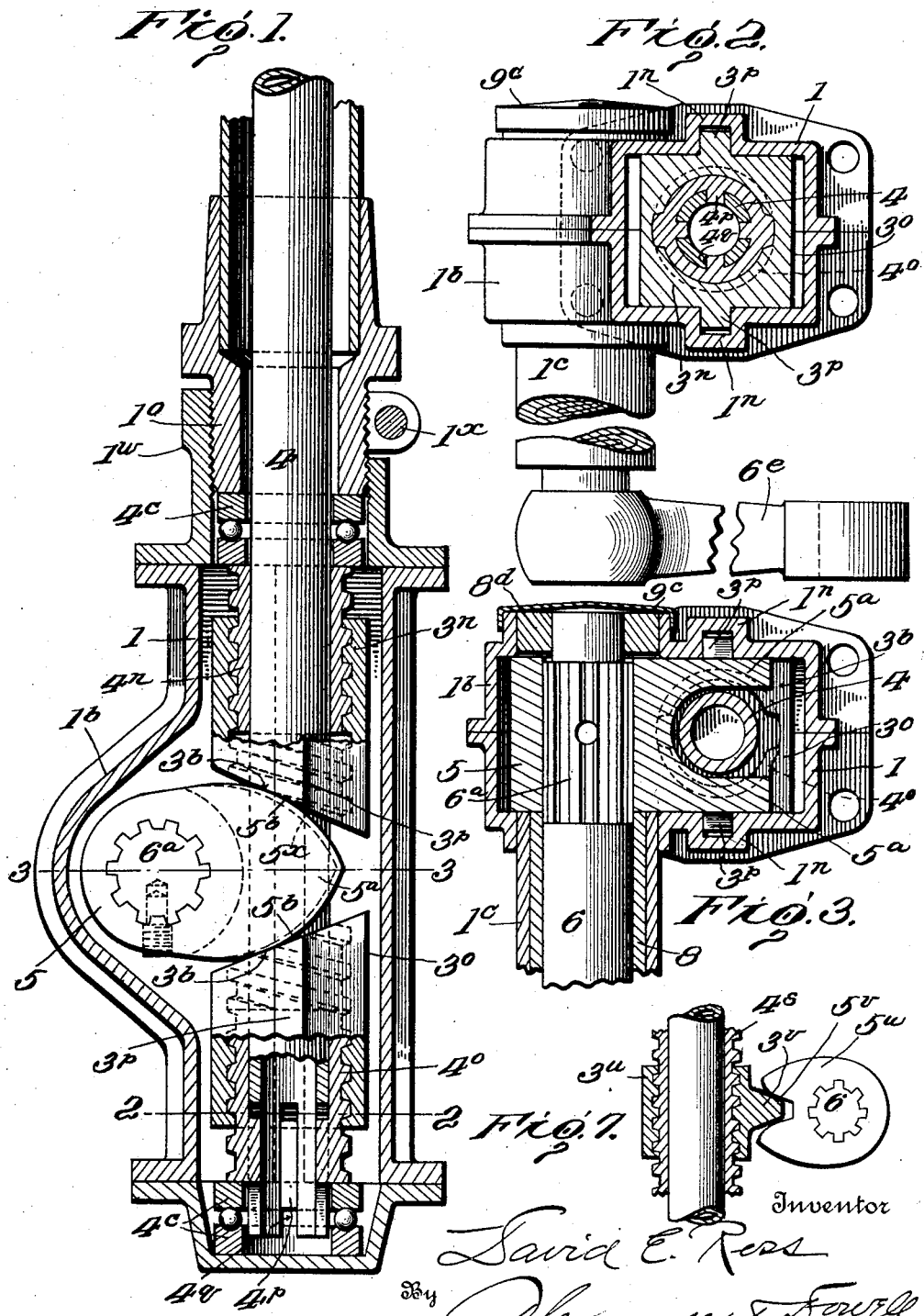

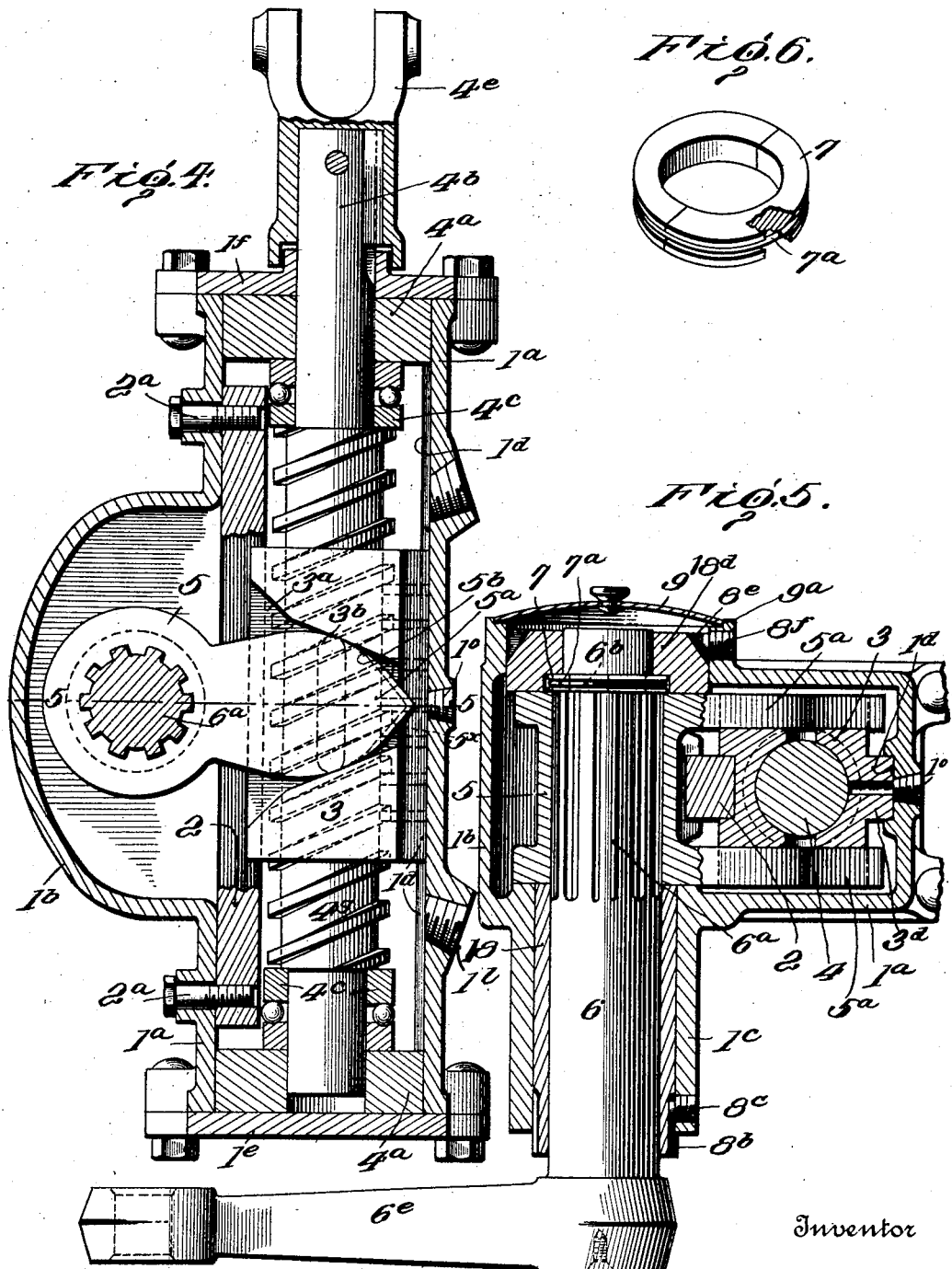

DAVID E. ROSS, OF LA FAYETTE, INDIANA, ASSIGNOR TO ROSS GEAR AND TOOL COMPANY, OF LA FAYETTE, INDIANA, A CORPORATION OF INDIANA.

STEERING-GEAR.

1,395,013.  Specification of Letters Patent.  Patented Oct. 25, 1921.

Application filed February 20, 1919. Serial No. 278,250.

*To all whom it may concern:*

Be it known that I, DAVID E. ROSS, a citizen of the United States, residing at La Fayette, in the county of Tippecanoe and State of Indiana, have invented certain new and useful Improvements in Steering-Gears; and I hereby declare that the following is a full, clear, and exact description thereof, reference being had to the accompanying drawings, which form part of this specification.

This invention is a novel steering gear particularly designed for use on automobiles and like vehicles, to control the movement of the steering wheel.

Its object is to provide a steering gear which will be very positive in action; will have a minimum amount of back lash or play between the manually operated steering wheel shaft and the rocking shaft connected with the steering wheels; which will be comparatively simple in construction, reliable in operation, very powerful, and capable of withstanding severe usage.

I have illustrated some practical embodiments of the invention in the accompanying drawings and will explain same to enable others to more readily comprehend the invention; but do not consider the invention limited to the particular constructions shown, and therefore have set forth in the claims the essentials of the invention and the novel constructions and novel combinations of parts therein for all of which I desire protection.

In said drawings:

Figure 1 is a longitudinal section through a steering head showing parts of the rocking member and of the actuating member in elevation.

Fig. 2 is a transverse sectional view on the line 2—2, Fig. 1, looking upward.

Fig. 3 is a transverse sectional view on the line 3—3, Fig. 1.

Fig. 4 is a longitudinal section through a modified steering head showing the sleeve and cam member in elevation.

Fig. 5 is a transverse section through such steering head on the line 5—5, Fig. 4.

Fig. 6 is a detail.

Fig. 7 is a detail view illustrating another modification.

The steering head shown in Figs. 1–3 of the drawings has an exterior casing, which may be of any suitable construction, and as shown has a tubular portion 1 for the reception of the screw and actuating member, and an offset portion $1^b$, at one side of the part 1, provided with a laterally projecting bearing $1^c$ for the rock shaft.

The casing may be provided at opposite sides of the portion 1, with longitudinal grooves or guideways $1^n$, for a purpose hereinafter described.

An actuating member is slidably mounted within and movable longitudinally of the part 1 of the casing. This actuating member is shown in Figs. 1–3 as formed of two opposed parts $3^n$ and $3^o$, each part being approximately rectangular in cross section and having ribs $3^p$ on its opposite sides to engage the guideways $1^n$, by which means the sleeve-nut is prevented from turning or twisting on its longitudinal axis during its movement in the casing.

The actuating member may be forcibly moved longitudinally in the casing by any suitable means; preferably, and as shown, each part ($3^n$, $3^o$) of the actuating member is provided with a longitudinal internally threaded bore by which such parts are respectively engaged with the threads of rotatable screw or worm members $4^n$ and $4^o$ that are arranged longitudinally of and within the part 1 of the casing.

The screw members $4^n$ and $4^o$ are both mounted upon a shaft 4, (which may be the steering wheel shaft, or connected therewith) that extends longitudinally through the part 1 of the casing and is confined against longitudinal movement therein by any suitable means, and may be rotatably supported and journaled in any suitable way in the casing. As shown shaft 4 is supported by screw members $4^n$ and $4^o$, said screw members $4^n$ and $4^o$ being supported by the parts $3^n$ and $3^o$, which parts are held in alinement by their splines or ribs $3^p$.

As shown shaft 4 is prevented from longitudinal motion by annular ball thrust bearings $4^c$ surrounding the shaft at opposite ends of the casing and against which the screw members $4^n$ and $4^o$ respectively bear. Preferably the screw member $4^n$ is formed or brazed or otherwise fixedly secured on the shaft 4, and one of the ball races or bearings $4^c$ is interposed between the upper end of the screw member $4^n$ and the inner end of a tubular nut $1^o$ screwed into the threaded cap $1^w$ on the upper end of the casing 1, and adjustable therein, and confined thereto in any suitable manner; and may be clamped when adjusted by a bolt $1^x$ engaging a split part of the tube as usual.

The screw member $4^o$ is shown as slidable but not rotatable upon the shaft 4. As shown said screw member is provided with internal splines or keys $4^p$ which engage slots $4^q$ in the shaft 4 and thus cause the member $4^o$ to rotate with the shaft, but enable member $4^o$ to be adjusted relatively longitudinally of the shaft 4 toward or from the member $4^n$, for the purpose hereinafter explained.

When the parts are properly adjusted the screw members $4^n$, $4^o$ and shaft 4 are rotatable but longitudinally immovable in the casing; while the actuating member (parts $3^n$, $3^o$) can travel like a nut on the screw members $4^n$, $4^o$ longitudinally of the shaft 4.

The shaft 4 may be connected by any suitable means to the steering wheel of the vehicle so that the screw members can be manually rotated.

The opposed ends of the part $3^n$, $3^o$ of the actuating member are shaped to form opposed oppositely inclined cam surfaces $3^b$ at each side of shaft 4; these cam surfaces being adapted to engage the opposed cam faces $5^b$ on opposite edges of cam members $5^a$ (see Figs. 1 and 3) substantially like the opposed surfaces of gear teeth engage. The cam members $5^a$, extend radially from a rock shaft 6 mounted in the part $1^b$ of the casing.

The cam members $5^a$ are preferably formed integral with a sleeve 5, which is non-rotatably secured on the head $6^a$ of the rock shaft 6, which, as shown in Figs. 1–3, is mounted in a bushing 8 in extension $1^c$ and in an annular bushing $8^d$ secured in an opening in the side of the casing opposite extension $1^c$ (see Fig. 3).

As shown in Fig. 5 the rock shaft 6 is mounted in a bushing 18, within the part $1^c$ of the casing, and in a bushing $18^d$ within the part $1^b$ of the casing opposite the part $1^c$. The end $6^a$ of shaft 6 is preferably provided with longitudinal ribs or splines engaging corresponding longitudinal key seats or splines in the sleeve 5, as shown. The rock shaft 6 may be provided or formed with the usual crank arm $6^e$ for connection to the steering wheels of the vehicles.

The opening in the part $1^b$ of the casing, into which opening bushing $8^d$ or $18^d$ is fitted, may be closed by any suitable means; a cap $9^c$ being shown in Figs. 2 and 3. In Fig. 5 a spring disk 9 is shown which is sprung into a suitable recess or chamfered seat $9^a$ in the outer end of the opening.

In the modification shown in Figs. 4 and 5 the casing is provided within the tubular part $1^a$, at the side opposite the offset portion $1^b$, with a guideway $1^d$, which may be formed by milling a groove in the wall of the casing, or by ribs thereon as shown. Diametrically opposite and parallel with this guideway $1^d$ is an opposed guide-bar or key 2, which may be a metal bar extending parallel with the guideway $1^d$, and secured in the casing in any suitable way as by bolts $2^a$.

The actuating member 3 is shown in Figs. 4 and 5 as a one-piece sleeve-nut slidably mounted within and movable longitudinally of the part $1^a$ of the casing, and having a rib $3^d$ engaging the guideway $1^d$, and a groove engaging the key 2; by which means said actuating member is prevented from turning or twisting on its longitudinal axis during its movement in the casing.

The actuating member 3 is provided with a longitudinal internally threaded bore which is engaged with the threads of a screw $4^s$ that extends through the sleeve-nut and is arranged longitudinally within the part $1^a$ of the casing.

The screw $4^s$ is shown as journaled in bushings $4^a$ secured in opposite ends of the part $1^a$ of the casing and retained therein by means of end plates or caps $1^e$ and $1^f$ bolted, or otherwise suitably secured to the ends of the part $1^a$ of the casing. Endwise movement of the screw $4^s$ in the casing may be prevented by any suitable means, ball thrust-bearings $4^c$ being indicated in the drawings.

The screw $4^s$ is shown as provided with a reduced cylindric portion $4^b$ on its upper end which extends through the cap $1^f$ and may be connected by any suitable means to the steering rod or shaft of the vehicle, so that the screw can be manually rotated. As indicated in Fig. 4 a coupling member $4^e$ is splined to the outer end of the part $4^b$ of the screw, for connection with the steering shaft (not shown).

The actuating member or sleeve-nut 3, shown in Figs. 4 and 5, is provided in its opposite sides with recesses $3^a$, the opposed side edges of which recesses are shaped to form cam surfaces $3^b$ (similar to the cam surfaces $3^b$ of the actuating member $3^n$, $3^o$, (Fig. 1) adapted to engage the opposed cam faces $5^b$ of the cam members $5^a$.

When in use all parts of the gear should be thoroughly lubricated; and such lubricant may be supplied through suitable apertures in the casing closed by plugs $1^l$, $1^o$, such as indicated in Fig. 4 of the drawings.

The relative shape of the opposed cam surfaces ($3^b$ of the actuating member and $5^b$ of the cam members $5^a$) are such that in all positions of the actuating member longitudinally of the casing and in all positions of the cam members $5^a$ circumferentially of the rocker shaft 6, (within the extreme limits of intended operative movements of the actuating member and the rock shaft), the opposite cam surfaces $5^b$ of each cam member will be engaged at both sides of such member with the related opposed oppositely inclined cam surfaces $3^b$ of the actuating member.

As shown in Figs. 1 and 4 each cam surface $3^b$ is approximately straight, while each cam surface $5^b$ of cam members $5^a$ is approximately developed on a convolute curve like the teeth of a gear. The opposed cam surfaces $3^b$ are relatively inclined, or converge in a direction away from the rock shaft.

In the modification shown in Fig. 7 the actuating member $3^u$ is slidably mounted upon the screw $4^s$, but is provided with a projecting finger or tooth $3^v$ like a gear tooth which engages a corresponding gear tooth notch $5^v$ on a cam member $5^u$ on the rock shaft 6; the opposed and engaging surfaces of the tooth $3^v$ and notch $5^v$ are gear tooth cam surfaces, approximately shaped as and like the cam surfaces $3^b$ and $5^b$ above described, and having the same relative action. This modification illustrates a reversal of the preferred construction in that the recess is in the member attached to the rock shaft, and the member entering such recess is on the actuating member.

In each case the opposed engaging cam surfaces should be so proportioned and so calculated that any longitudinal movement of the actuating member or members will, through the cam member or members, impart a corresponding rocking movement to the rock shaft. And when the parts are properly adjusted back lash or appreciable vibratory movement of the cam members relative to the actuating member is prevented by reason of the peculiar relative form and proportions of the opposed engaging cam surfaces $3^b$ and $5^b$ of the actuating member and cam member.

By reason of the peculiar gear-tooth like formation of the cam members I am able to obtain comparatively broad contacting surfaces between the cam surfaces instead of a mere line of contact as in prior devices where there has been direct contact between the shaft member and the actuating member.

*Operation.*

When the steering wheel shaft is turned, the actuating member will be forced to move longitudinally of the casing (by reason of its threaded engagement with the screw operated by said shaft) but is prevented from rotating therein. As the actuating member moves longitudinally its cam surfaces $3^b$ correspondingly move the cam members $5^a$ to right or left, and cam members $5^a$ in turn impart a corresponding partial rotative movement to the rock shaft 6.

The actuating member and cam members $5^a$ are relatively so adjusted that both cam surfaces $5^b$ of each member is in close contact with the opposed cam surfaces $3^b$ of the actuating member.

I have shown two adjusting means either or both of which may be used to insure close contact between the cam surfaces of the cam member and the cam surfaces of the actuating member. In the construction shown in Fig. 1 the parts $3^o$, $3^n$ of the cam member can be approached,—so as to cause the cam $3^b$ to properly and closely contact with the cam surfaces $5^b$,—by loosening the clamp bolt $1^x$ and then turning member $1^o$, the members $4^o$ $4^n$ cause the members $3^o$, $3^n$ to approach each other and closely and properly engage the cam surfaces $3^b$ with the interposed cam surfaces $5^b$: and after such adjustment the bolt $1^o$ can be tightened to securely clamp and hold the members in adjusted position. In this construction it is possible to not only take up any lost motion due to wear of the cam surfaces but also any lost motion occasioned by wear between the threads of the screw and the actuating member or parts thereof.

As shown in Fig. 5 the outer end of bushing 18 may be provided with a peripheral series of slots $8^b$, any one of which may be engaged by a screw $8^c$, tapped through the casing, to lock the bushing 8 in adjusted position. The bushing $18^d$ may be similarly provided with slots $8^e$, any one of which can be engaged by a screw $8^f$ tapped through the casing, to lock bushing $8^d$ in adjusted position. The bushings 18, $18^d$ are preferably eccentric bushings so that by adjusting the bushings 18 and $18^d$ rotatively and similarly the cam members $5^a$ can be adjusted so as to bring the cam surfaces $5^b$ into close contact with the cam surfaces $3^b$, and when perfectly adjusted said bushings can be locked by the screws $8^c$, $8^f$ or other suitable means, so that they cannot get out of adjustment.

As stated the opposed cam surfaces $3^b$ and $5^b$ should be so relatively generated as to be constantly in contact at each and both sides of each cam member, and prevent play or back lash between the rock-shaft and actuating member.

If any undesirable wear should ultimately develop between the cam surfaces, the cam surfaces $5^b$ may be ground slightly, as indicated by the dotted lines $5^x$ in Figs. 1 and 4, to compensate for such wear without causing the gear to bind in extreme positions. Of course when so ground the nut $1^o$ or rock shaft 6, or both, would have to be adjusted as described to bring the cam surfaces $5^b$, $3^b$ into contact; but the wear of the cam surfaces will be very slight, and ordinary wear may be taken up as described without causing the gear to bind.

It should be noted that in this gear the cam surfaces 5$^b$ of the cam members always directly contact with the cam surfaces 3$^b$ of the actuating member in all positions, and the angular motion of the cam members relatively to the actuating member, as the latter travels along the screw, is compensated for by the peculiar formation of the opposed engaging cam surfaces of the cam members and actuating member. In this construction intermediate rocking members or blocks such as have heretofore been interposed between crank fingers on the rocker shaft and recesses in the sleeve nut (such for example as shown in my Patent No. 1,157,123 and my Reissue Patent No. 11,866) are neither employed nor necessary, and the invention therefore simplifies the construction and lessens the number of parts liable to wear.

If desired the sleeve 5 can be secured against endwise movement on the shaft 6 by means of a collar 7 (see Figs. 5 and 6) seated in an annular groove 6$^b$ in the rock-shaft at the outer end of the sleeve 5; and the opposite sections of collar 7 may be detachably retained in place around the shaft by a contractile spring 7$^a$ fitted in an annular groove in the periphery of the collar sections and preventing the halves falling apart when the bushing 8$^d$ is removed.

What I claim is:

1. In combination a casing; a sliding actuating member therein provided with recesses in its opposite sides, the opposite sides of each recess forming oppositely inclined cam surfaces to engage an intermediate cam member; means for reciprocating said actuating member; a rocker shaft beside said actuating member; cam members on said rocker shaft each entering one of the recesses in said actuating member, each cam member having gear tooth cam surfaces on its opposite sides engaging the related opposite cam surfaces of the recess in which such cam member is entered; whereby the angular motion of the cam members relative to the actuating member is compensated for.

2. In combination a casing; a sliding sleeve-nut therein provided with recesses in its opposite sides, the opposed sides of each recess being dressed to form oppositely inclined cam surfaces to engage the opposed edge of an intermediate cam member; a screw for reciprocating said sleeve-nut; a rocker-shaft beside said sleeve-nut; cam members on said rocker shaft entering the recesses in said sleeve-nut, each cam member having its opposite sides dressed to form gear tooth cam surfaces engaging the related oppositely inclined cam surfaces of the recess in which such cam member is entered; whereby when the actuating member is operated the shaft is rocked, and the angular motion of the cam members relative to the sleeve-nut is compensated for.

3. In mechanism of the character specified, a movable actuating member provided with oppositely inclined cam surfaces; a shaft; and a cam member thereon provided with oppositely inclined surfaces respectively engaging the working portion of the face of the opposed cam surface of the actuating member; whereby when the actuating member is moved the shaft is rocked.

4. In combination a casing; a longitudinally movable actuating member therein provided with opposed oppositely inclined converging cam surfaces; means for reciprocating said actuating member; a rock shaft beside said actuating member; and a cam member on said rock shaft having oppositely inclined cam surfaces each having the working portion of its face conforming to the working portions of the face of a gear tooth, the working portions of the faces of the cam surfaces of the cam member engaging the opposed cam surfaces of the actuating member between which they are entered; whereby when the actuating member is moved the shaft is rocked by the rolling contact between such cam surfaces, substantially as described.

5. In combination an actuating member having opposed oppositely inclined converging cam surfaces, and a cam member entered between such cam surfaces, the opposite side edges of such cam member simultaneously engaging the oppositely inclined cam surfaces, the sides of the member each having the working portion of its face conforming to the working portions of the face of a gear tooth so as to constantly maintain contact between both sides of said cam member and the opposite cam surfaces and compensate for the angular movement of said cam member relatively to the actuating member.

6. In mechanism of the character specified, a two part actuating member, the parts of said member having cam surfaces, the said cam surfaces being straight oppositely inclined and converging; a shaft; a cam member thereon extending between the parts of the actuating member and provided with opposite cam surfaces, each having the working portion of its face conforming to the working portion of the face of a gear tooth, the working portions of the cam surfaces engaging the opposed cam surfaces of said parts, whereby when the actuating member is moved the shaft is rocked.

7. In mechanism of the character specified, a casing; a sliding actuating member therein provided on each side with opposed oppositely inclined cam surfaces; a rocker shaft; a pair of relatively adjusted cam members on said shaft respectively extending between the related opposite cam surfaces on the actuating member, each cam member having opposite gear tooth cam surfaces each having the working portion of its face conforming to the working portion of the face of a gear tooth, the working portions of the cam surfaces engaging the related opposite cam surfaces of the cam members, whereby when the actuating member is shifted the shaft is rocked, and means for adjusting said cam members.

In testimony that I claim the foregoing as my own, I affix my signature.

DAVID E. ROSS.